R. E. CLARK.
STRAINERS FOR COFFEE POTS.
No. 171,601.  Patented Dec. 28, 1875.
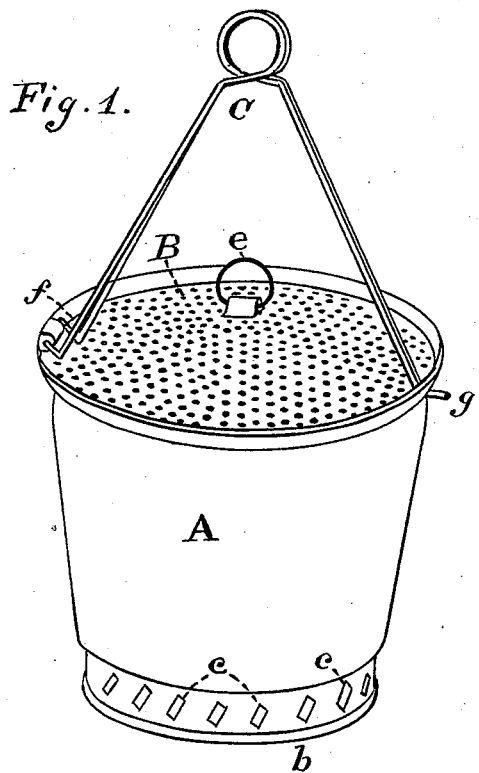
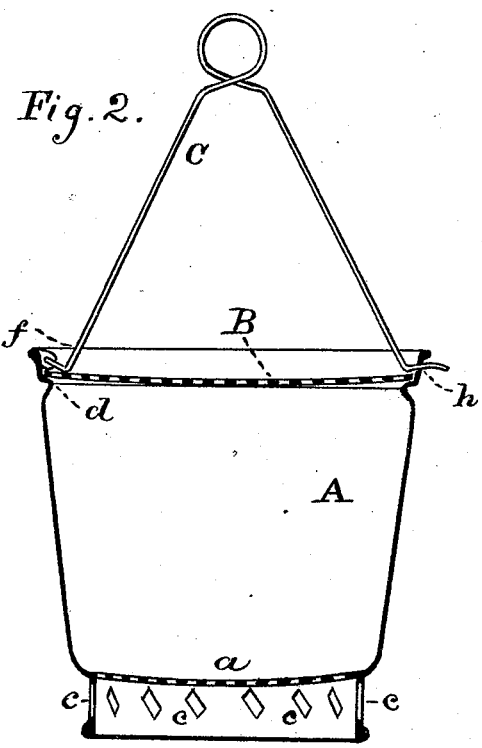
Witnesses:
H. Anthon
J. T. Hamilton
Inventor;
Robert E. Clark
by J. S. Kellogg
Attorney.

UNITED STATES PATENT OFFICE.

ROBERT E. CLARK, OF BOONVILLE, NEW YORK.

IMPROVEMENT IN STRAINERS FOR COFFEE-POTS.

Specification forming part of Letters Patent No. 171,601, dated December 28, 1875; application filed December 7, 1875.

*To all whom it may concern:*

Be it known that I, ROBERT E. CLARK, of Boonville, in the county of Oneida and State of New York, have invented certain new and useful Improvements in Filterers, Herb and Coffee Strainers, and Extractors; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the said drawing, Figure 1 represents a perspective view of my invention, and Fig. 2 is a vertical section of the same.

In the said drawing, A designates the casing of the utensil, formed somewhat like a bucket, with the bottom $a$ perforated, as shown, and provided with a rim, $b$, having the apertures $c$, the said rim serving to raise the bottom $a$ a suitable distance from the surface upon which the implement stands or may be placed. The shoulder $d$ is formed upon the inside of the casing A, at or near the top thereof, as a seat or rest for the perforated plate B, the latter being removable. The perforated plate B has the handle $e$, for placing and removing the same. It conforms to the casing, and, when in place, rests upon the shoulder $d$, above mentioned. The bail C is hinged at one end to the brim of the vessel or casing, and said bail is formed at the hinged end $f$ so as to clamp the perforated plate B when said plate is in place. The other end $g$ of said bail is also bent, so that it may pass through an aperture, $h$, near the brim of the casing, and also clamp the edge of the perforated plate B. The bail C is readily opened by pressing the end $g$ inward, and withdrawing it from the aperture $h$, when the perforated plate B may be removed.

In operation, the coffee, herbs, or other substances are placed in the vessel, and the perforated plate B is placed in its seat, (the shoulder $d$.) The bail is then closed, the end $g$ being sprung through the aperture $h$, and the utensil, thus adjusted, is stood in a vessel containing sufficient boiling water to cover all but the bail, the water being allowed to pass through the apertures $c$, and the perforated bottom $a$, and perforated plate B.

I claim as my invention—

The implement for straining and extracting, consisting of the casing A, constructed with the shoulder $d$, and provided with the removable perforated plate B, the hinged bail C, perforated bottom $a$, and rim $b$, all constructed substantially as and for the purposes set forth.

In testimony that I claim the foregoing as my own I affix my signature in presence of two witnesses.

ROBERT E. CLARK.

Witnesses:
 ORIN ACKERMAN,
 H. C. KIMBALL.